United States Patent [19]

Kitamura et al.

[11] Patent Number: 4,828,345

[45] Date of Patent: May 9, 1989

[54] SELECTIVE LIGHT TRANSMITTABLE FILM HAVING EXCELLENT ANTI-FOGGING AND INFRARED RAY REFLECTIVE PROPERTIES

[75] Inventors: Shuji Kitamura, Nagaokakyo; Kiyohiko Nakae, Hyogo; Kozo Kotani, Toyonaka; Yoshihiro Nakatsuji, Ibaraki, all of Japan

[73] Assignee: Sumitomo Chemical Company, Limited, Osaka, Japan

[21] Appl. No.: 72,841

[22] Filed: Jul. 9, 1987

[30] Foreign Application Priority Data

Jul. 28, 1986 [JP] Japan .................. 61-177117

[51] Int. Cl.⁴ .................. G02B 1/10; G02B 5/20; B32B 15/04; B32B 23/04
[52] U.S. Cl. .................. 350/1.6; 350/1.7; 350/582; 427/393.4; 428/464
[58] Field of Search .................. 350/1.6, 1.7, 582; 427/393.4; 428/464

[56] References Cited

U.S. PATENT DOCUMENTS 3,867,175  2/1975  Dornte .................. 350/582 X
4,413,877  11/1983  Suzuki et al. .................. 350/1.7
4,703,997  11/1987  Ijiri et al. .................. 350/96.23

FOREIGN PATENT DOCUMENTS 55-21251    2/1980  Japan .
55-87543    7/1980  Japan .
56-126152  10/1981  Japan .
57-59748    4/1982  Japan .
57-144751   9/1982  Japan .
57-174240  10/1982  Japan .

Primary Examiner—John K. Corbin
Assistant Examiner—David J. Edmondson
Attorney, Agent, or Firm—Wenderoth, Lind & Ponack

[57] ABSTRACT

A selective light transmissible film or sheet having excellent anti-fogging properties, produced by forming a thin film of a metal and/or a metal compound having transparency and infrared ray reflective characteristics, on the surface of one side of a cellulose derivative film or sheet of which the surface of the other side is saponified with an alkaline aqueous solution, or on the surface of one side of a cellulose derivative film or sheet of which both surfaces are saponified with an alkaline aqueous solution.

7 Claims, 1 Drawing Sheet

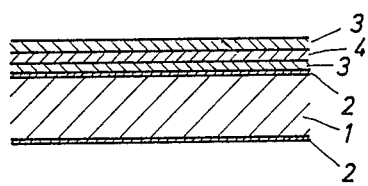
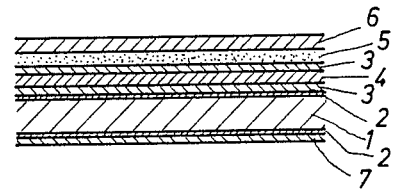
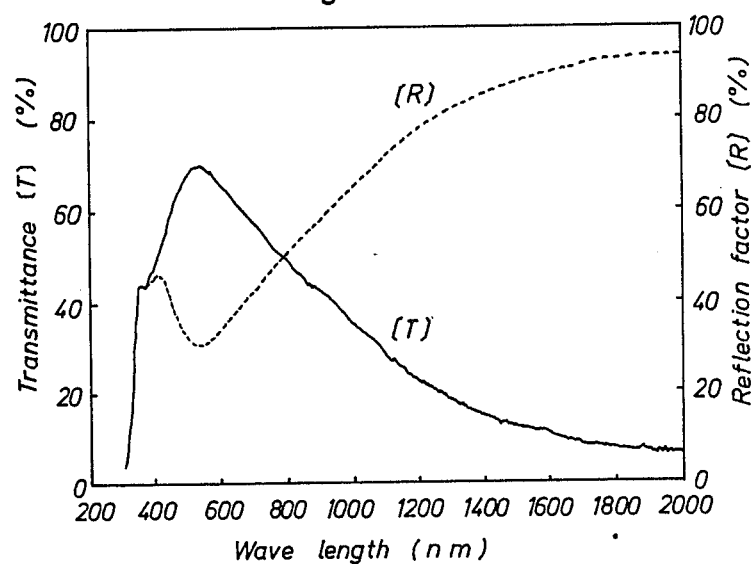

SELECTIVE LIGHT TRANSMITTABLE FILM HAVING EXCELLENT ANTI-FOGGING AND INFRARED RAY REFLECTIVE PROPERTIES

BACKGROUND OF THE INVENTION

The present invention relates to a selective light-transmissible film or sheet which has good transparency in the visible ray region, high infrared ray reflectivity and moreover has excellent anti-fogging properties.

In recent years, it has been desired to render windows highly heat-insulative (or infrared ray screenable) from the viewpoint of energy saving for windows of air-conditioned buildings and refrigerator showcase windows, and from the view point of comfortability in summer for vehicles such as automobiles.

Means to render windows to have such heat insulation include:

(1) use of multiple-glazed windows,
(2) use of infrared ray reflective glass,
(3) adherence of infrared ray reflective film to windowpanes, etc.

The method of using infrared ray reflective film is less expensive in comparison with the other methods, and the film has excellent heat insulation. As for the so-called selective light transmissible film produced by superposing a thin film of metal such as Al, Au or Cu etc. on a transparent plastic film such as that of polyethylene terephthalate, or further laminating such a metallic film with a transparent dielectric layers of a high refractive index so as to make it suitably pass visible rays and reflect infrared rays, many proposals have been made such as Japanese Patent Publication No. 59147/85, Japanese Patent Publication No. 1296/86, Japanese Patent Kokai No. 117228/83, Japanese Patent Kokai No. 35943/86, etc.

These prior techniques are effective in providing heat insulative films which suitably transmit visible rays and reflect infrared rays. However, when they are adhered to the inside of windows of buildings, automobiles, cool showcases, etc., anti-fogging properties of the inner surface of the film can not be expected, that is, water droplets condense on the film surface and impair the transmission of visible rays.

SUMMARY OF THE INVENTION

The object of the present invention is to provide a selective light-transmissible film or sheet having good anti-fogging properties, which remedies the above-mentioned defects of the prior infrared ray reflective films, without impairing the external appearance of the film.

The object of the present invention is accomplished by forming a thin film layer of a metal and/or a metal compound having transparency and infrared ray reflectivity, on one surface of a cellulose derivative film or sheet, of which the other surface is saponified, or on one surface of such a film or sheet, of which both surfaces are saponified.

BRIEF DESCRIPTION OF THE DRAWINGS

Some embodiments of the present invention are illustrated in the drawings wherein:

FIG. 1 is a schematic cross-section of a selective light transmissible film embodying the present invention, FIG. 2 is a schematic cross-section of another selective light transmissible film embodying the present invention, and FIG. 3 is a graph showing the light transmittance and reflection factor in relation to the wave length of a film embodying the present invention.

In FIGS. 1 and 2, indicated with the numeral 1 is a cellulose derivative film, 2 is a saponification treated layer, 3 is a thin $TiO_2$ layer, 4 is a thin Ag layer, 5 is an agglutinant or wet-type adhesive layer, 6 is a release backing film, and 7 is a protective film.

DESCRIPTION OF THE PREFERRED EMBODIMENTS

Referring to FIGS. 1 and 2, the cellulose derivative films or sheets in the present invention are obtained by casting or extrusion from one or more kinds selected from cellulose diacetate, cellulose triacetate, cellulose acetate-butyrate, cellulose propionate, etc. Casting is preferred since a film or sheet having good surface luster, transparency, and thickness precision can be easily obtained. The thickness is not critical, but for lamination on a windowpane, a thickness usually within the range of from 0.01 to 2 mm, preferably within the range of from 0.02 to 1 mm is suitable.

The saponification treatment of the surface of the cellulose derivative film or sheet 1 can be made by immersing the film or sheet 1 in an aqueous solution of NaOH or KOH or a mixed aqueous solution of these. The degree of saponification can be regulated by the alkali concentration of the aqueous solution, the temperature of the aqueous solution, and the immersion time of the film or sheet 1. The thickness of the saponified layer 2 is preferred to be 5–10 $\mu$ in order to give good anti-fogging properties. The saponification treatment of the film or sheet 1 may be made to one surface or both surfaces, but it is preferably to saponify also the surface on which the thin film 3,4 of a metal and/or a metallic compound having transparency and infrared ray reflectivity is to be formed, that is to say, it is preferable to saponify both surfaces.

Thus, by the saponification treatment of both surfaces, it is possible to give to the surface of one side anti-fogging properties and to the surface of the other surface excellent adhesiveness to the thin film having transparency and infrared ray reflectivity.

The thin films 3,4 composed of a metal and/or a metal compound having transparency and infrared ray reflectivity at the same time which can be used in the present invention include thin films of Al, An, Sn, Ni, Cr, Au, Ag, Pt, Cu, Ti, In, etc, or alloys composed mainly of these and $TiO_2$, TiO, $In_3O_3$, $SiO_2$, SiO, ZnS, CuO, $CuO_2$, $Al_2O_3$, etc. or mixtures of these. The thin film 3,4 of these metals and/or metal compounds may be of one layer or a laminate of two or more layers. When using a multiple layer, it is favorable to form a metal compound film 4 at first, then a metal film second on it, and further form a metal compound film on it. The thickness of the thin film 3 is dependent on the kind of the above-mentioned metals and/or metal compounds or the laminate structure the films. However, the suitable thickness of each layer is normally 50–1000 Å, preferably in the range of 100–500 Å.

As for the methods of forming thin films 3,4 of the above-mentioned metals and/or metal compounds on the cellulose derivative film or sheet 1, physical vapor deposition methods are most suitable, such as vacuum vapor deposition, sputtering, ion-plating, etc. Besides these, plating method, thermal decomposition method, etc. are useful for the formation of metal thin films 4, and chemical vapor deposition method, coating method, etc. are useful for the formation of metal compound thin films 3.

In the present invention, it is possible to form a film or sheet for sticking to glass windows from the selective light transmissible film or sheet having excellent anti-fogging properties obtained by the above-mentioned method, by coating a transparent agglutinant or a wet-type adhesive 5 on the surface on which the metal and/or metal compound thin film 3,4 has been formed, further protecting the surface with a release backing film 6, and protecting the other surface having anti-fogging properties with a protective film 4.

Examples of the transparent agglutinants to coat on the film or sheet are those of n-butyl acrylate, 2-ethylhexyl acrylate, ethylene-vinyl acetate, etc. and examples of the wet-type adhesives are polyvinyl alcohol, carboxymethyl cellulose, pluran, etc.

As the release backing film 6 to protect the surface of the above-mention agglutinant or wet-type adhesive layer 5, it is possible to use a film of polyester, polyethylene, polypropylene, etc. or a release paper of which the surface is release treated with a silicon or fluorine resin. Examples of the releasable protective films 7 having anti-fogging properties are those of polyester, polyethylene, polypropylene, etc.

To the cellulose derivative film or sheet 1, and/or to the transparent agglutinant or wet-type adhesive 5, it is possible to add a suitable quantity of ultraviolet ray absorber, stabilizer to light, anti-oxidant, plasticizer, dye, pigment, inorganic filler, etc. within the range in which the excellent anti-fogging properties, transparency and infrared ray reflectivity of the film or sheet of the present invention are not impaired. Among others, the use of an ultraviolet ray absorber is useful for films or sheets for sticking to glass windows, the transmission of ultraviolet rays through which is not desirable, for example for glass windows of food refrigerators.

Thus, the selective light transmissable film or sheet of the present invention has the following advantages:

(1) it has almost permanent anti-fogging properties since its basic material is a film or sheet of a saponification treated cellulose derivative, (2) when forming a thin film of a metal and/or metal compound on the saponification treated surface, it is possible to obtain higher adhesion in comparison with conventional prior techniques, without primer treatment of the surface of the basic material.

The film or sheet obtained by the method of the present invention is most suitable to use as stuck to the windowpanes of automobiles, buildings, refrigerated showcases, or to the inside of greenhouses, by virtue of its characteristics. and it displays excellent anti-fogging properties and transparency as well as heat insulation due to its infrared ray reflectivity, for a long time.

In the following the present invention will be explained by way of Examples.

[EXAMPLE 1]

A cellulose acetate film with a thickness of 0.1 mm was immersed for 5 minutes in an aqueous 0.5% NaOH bath regulated at a temperature of 40° C., then washed with water, and dried at 60° C. for 30 minutes. The thickness of the saponified layer of the thus obtained film was about 6 μ. On one side of the film, first a thin film of $TiO_2$ of 150 Å was formed, using a bell jar type vacuum vapor deposition apparatus, in a vacuum at $1 \times 10^{-5}$ torr, then on this thin film a thin film of Ag of 200 Å and further on the latter thin film a thin film of $TiO_2$ of 150 Å were laminated successively.

On the surface of the thus obtained thin film, a checkered pattern was engraved with a cutter knife so that 100 sections of 1 mm² (1 mm × 1 mm) could be formed on the surface within an area of 1 cm² (1 cm × 1 cm) of the thin film. An adhesive tape (for example Cellotape ®) was stuck on the thin film so as to cover these 100 sections completely. One end of this adhesive tape was drawn quickly in the direction of 180° so that the tape could be separated completely. It was found that no laminated thin film in any section in the 100 sections was peeled off. The transmittance of visible rays and reflectance of infrared rays exhibited excellent transparency and infrared ray reflecting characteristics as shown in FIG. 3. As for the other surface of the film on which the $TiO_2/Ag/TiO_2$ thin film was not laminated, a low temperature antifogging test and a high temperature anti-fogging test were made, by means of an anti-fogging tester in which the water temperature and the air temperature were regulated to 20° C. and 3° C., or 40° C. and 20° C. respectively. The results showed that it had excellent anti-fogging properties.

For the purpose of comparison, the same anti-fogging tests were made for an infrared ray reflective film sold on the market, but it had no anti-fogging properties and the transparency was lost due to fogging.

[EXAMPLE 2]

The anti-fogging surface of the film of Example 1 was protected with a polypropylene film having a thickness of 0.02 mm. The surface on which the $TiO_2/Ag/TiO_2$ thin film was formed, was coated with an emulsion of 2-ethylhexyl acrylate and air-dried, and then a silicon-coated releasing paper was stuck on it, thus to form a film for sticking to glass windows. While peeling off the releasing paper, the film was stuck to the inside of a glass greenhouse, 1 m in width, 2 m in depth, and 1 m in height, and thereafter the polypropylene protective film was removed. The temperature and relative humidity in a glass greenhouse of the same type to which the film was not stuck, was 18°–22° C. and 100%, respectively, with a large amount of water droplets adhering to the inner surface of the glass being observed, whereas the temperature in the glass greenhouse to which the above-mentioned film was stuck, was maintained at 11°–16° C., and exhibited excellent anti-fogging properties, transparency and heat insulation due to infrared ray reflection, with no water droplets adhering to the inner surface of the glass being observed.

What we claim is:

1. A selective light transmissible film or sheet having excellent anti-fogging properties, produced by forming a thin film of a metal and/or a metal compound having transparency and infrared ray reflective characteristics, on the surface of one side of a cellulose derivative film or sheet of which the surface of the other side is saponified with an alkaline aqueous solution, or on the surface of one side of a cellulose derivative film or sheet of which both surfaces are saponified with an alkaline aqueous solution.

2. A selective light transmissible film or sheet as claimed in claim 1, wherein an agglutinant or a wet-type adhesive is coated on the surface on which the thin film of a metal and/or a metal compound has been formed and the surface is protected by a release backing film, and the surface of the other side is protected by a protective film.

3. A film or sheet as claimed in claim 1 or 2 wherein the cellulose derivative is selected from the group consisting of cellulose diacetate, cellulose triacetate, cellulose acetatebutyrate, cellulose propionate and a mixture of two or more of them.

4. A film or sheet as claimed in claim 1 or 2 wherein the thickness of the cellulose derivative film is 0.01 mm to 2 mm.

5. A film or sheet as claimed in claim 1 or 2 wherein the metal is selected from the group consisting of Al, An, Sn, Ni, Cr, Au, Ag, Pt, Cu, Ti, In and alloys of the same.

6. A film or sheet as claimed in claim 1 or 2 wherein the metal compound is selected from the group consisting of $TiO_2$, $TiO$, $In_2O_3$, $SiO_2$, $SiO$, $ZnS$, $CuO$, $CuO_2$, $Al_2O_3$ and mixtures of two or more of them.

7. A film or sheet as claimed in claim 1 or 2 wherein the thickness of the thin layer of the metal and/or metal compound is 50–1000 Å.

* * * * *